United States Patent [19]

Kopp

[11] 3,984,999

[45] Oct. 12, 1976

[54] FRICTION OVERLOAD COUPLING

[76] Inventor: Jean Ernst Kopp, Meyriez, Murten, Switzerland

[22] Filed: Nov. 7, 1974

[21] Appl. No.: 521,898

[30] Foreign Application Priority Data

Nov. 19, 1973 Switzerland.................... 16255/73

[52] U.S. Cl. .............................. 64/30 C; 64/30 R; 192/56 R
[51] Int. Cl.² ........................................... F16D 7/02
[58] Field of Search ............... 64/30 C, 30 R, 30 D; 192/56

[56] References Cited
UNITED STATES PATENTS

| | | | |
|---|---|---|---|
| 1,043,111 | 11/1912 | Fellmeth .................... | 64/30 |
| 1,632,539 | 6/1925 | Chitton ..................... | 64/30 C |
| 2,709,903 | 6/1955 | Hallewell ................... | 64/30 P |
| 3,372,561 | 3/1968 | Howard et al. ............. | 64/30 R |
| 3,775,998 | 12/1973 | Century ..................... | 64/30 C |

FOREIGN PATENTS OR APPLICATIONS

| | | | |
|---|---|---|---|
| 1,163,935 | 11/1955 | France ...................... | 64/30 C |
| 794,720 | 5/1957 | United Kingdom .......... | 64/30 C |

*Primary Examiner*—Samuel Scott
*Assistant Examiner*—Randall Heald
*Attorney, Agent, or Firm*—Haseltine, Lake & Waters

[57] ABSTRACT

An elastic friction overload coupling having two coupling halves and friction bodies arranged therebetween, wherein both coupling halves are pressed against one another with spring force for transmitting a rotational moment, and wherein at the one coupling half there is fixedly mounted against rotation a ring-shaped element and biased in axial direction by spring force against the aforementioned one coupling half. Components of the second coupling half are arranged between the first coupling half and its ring-shaped element. According to the invention there are provided screws in order to detach the ring-shaped element from the first coupling half, so as to be able to exchange segment-shaped friction bodies or sectors of the first and/or second coupling halves, without having to displace the latter upon their shafts or to dismantle the same, and that the screws are arranged at the region of the outer periphery of the coupling and carry the springs as entrainment means for the ring-shaped element.

8 Claims, 7 Drawing Figures

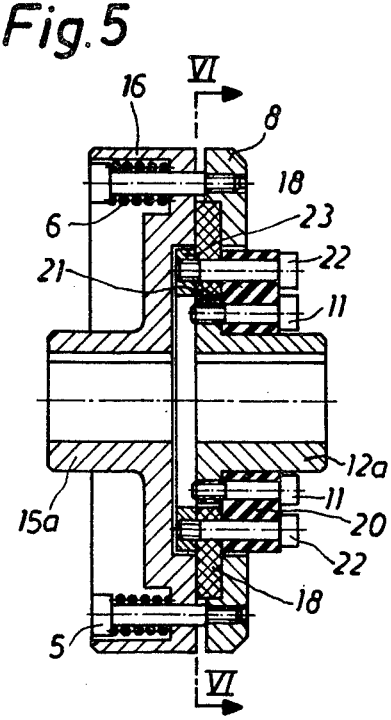
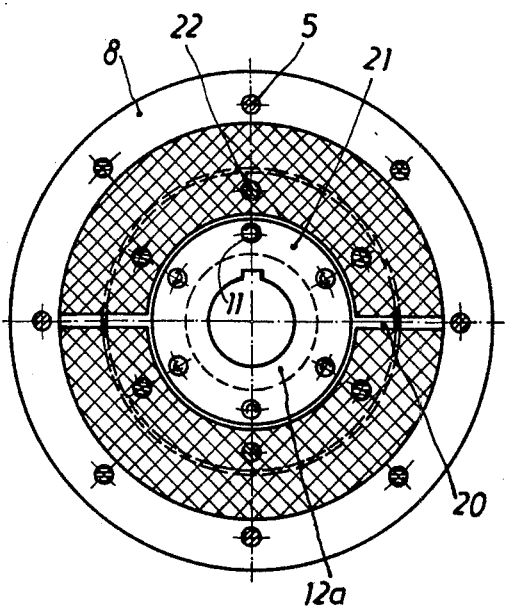
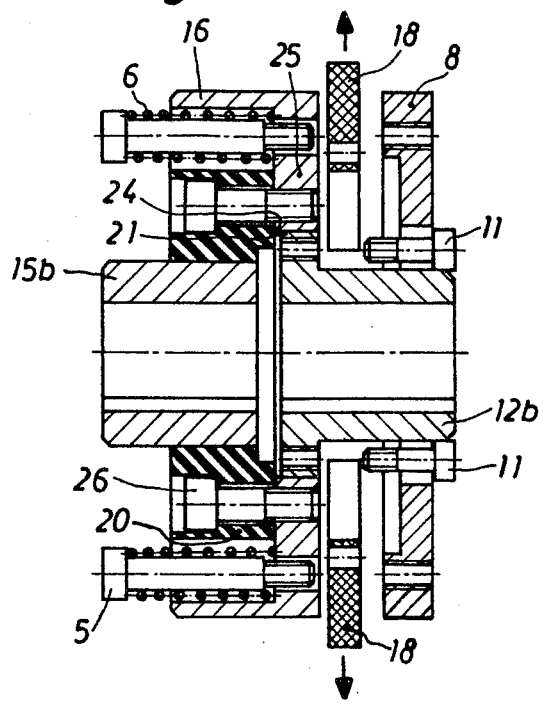

FRICTION OVERLOAD COUPLING

BACKGROUND OF THE INVENTION

The present invention relates to a new and improved construction of a friction overload coupling for safeguarding machines against overload, wherein friction bodies can be exchanged without the coupling components, which are seated upon a drive shaft or a power take-off shaft, having to be displaced or dismantled at such shafts, and wherein the frictional force at the coupling components mounted at the shafts can be changed.

With the friction couplings known up to the present it is necessary, during exchange of the friction bodies, for instance upon wear thereof, to dismantle at least one coupling part or component from the shaft and thus also displace such shaft with this part, something which requires a great deal of work. The same is also necessary when the friction force of the coupling must be changed.

SUMMARY OF THE INVENTION

It is a primary object of the present invention to provide an improved friction overload coupling which is not subject to such drawbacks.

A further object of the invention is to provide a friction overload coupling wherein the coupling can take up shaft mountings.

Now in order to implement these and still further objects of the invention, which will become more readily apparent as the description proceeds, the invention contemplates an elastic friction overload coupling having two coupling halves and friction bodies arranged therebetween. The two coupling halves are pressed against one another with spring force for transmitting a rotational moment, and wherein at the one coupling half there is fixedly mounted against rotation a ring-shaped element and biased in axial direction by spring force against the aforementioned one coupling half. Components of the second coupling half are arranged between the first coupling half and its ring-shaped element. According to the invention, there are provided screws in order to detach the ring-shaped element from the first coupling half so as to be able to exchange segment-shaped friction bodies or sectors of the first and/or second coupling halves, without having to displace or dismantle the latter at their shafts, and wherein the screws are arranged at the region of the outer periphery of the friction coupling and carry springs as entrainment means for the ring-shaped element.

BRIEF DESCRIPTION OF THE DRAWING

The invention will be better understood and objects other than those set forth above will become apparent when consideration is given to the following detailed description thereof. Such description makes reference to the annexed drawing wherein:

FIG. 5 shows a further exemplary embodiment of the inventive coupling, including an elastic element that connects a hub portion with both halves of a friction disk;

FIG. 6 is a sectional view taken along the lines VI—VI of FIG. 5; and

FIG. 7 shows, in a view similar to that of FIG. 5, how the halves of the friction disk can be removed from the coupling without dismantling the same.

DETAILED DESCRIPTION OF THE PREFERRED EMBODIMENTS

Figure 1:
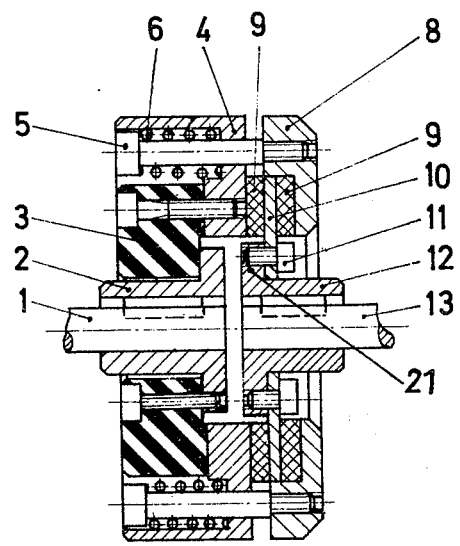
FIG. 1 is a cross-sectional view through an exemplary embodiment of the coupling of this development.
Figure 2:
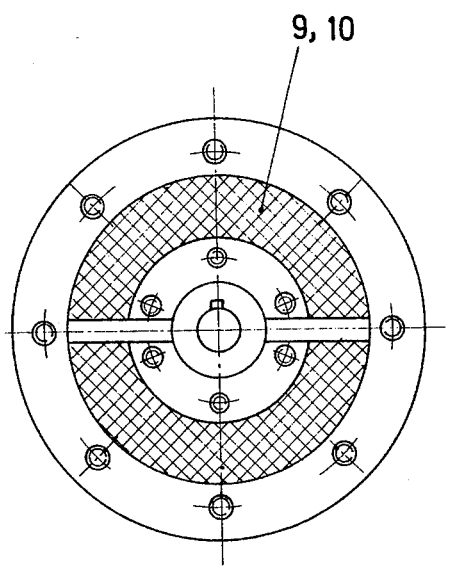
FIG. 2 is a view of the coupling of FIG. 1 without the component 8 being illustrated.

Describing now the drawing, in FIG. 1 reference numeral 1 designates a shaft at which there is secured an optional hub portion 2. A similarly optional elastic part 3, which can consist of rubber or another elastic material, is threadably connected on the one hand with the hub portion 2 and on the other hand with a flange 4. At its periphery there are arranged a number of screws 5 which connect a ring 8 via springs 6 with flange 4 and drives such as entrainment means. Friction linings or coverings 9 are secured at ring segments or sectors 10, which are threaded via screws 11 at a hub portion 12. Component 12 is fixedly connected with a shaft 13.

The springs 6 press the ring 8 against the flange 4 and produce a friction force at the friction linings or coverings 9.

Figure 3:
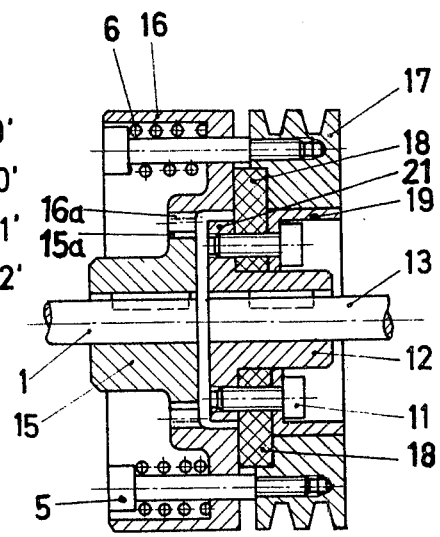
FIG. 3 is a cross-sectional view of the coupling in an embodiment with belt disk and mechanical elastic part.

In the embodiment of FIG. 3 there may be seated at the shaft 1 a hub 15 which is constructed with teeth 15a with which engage counter or complementary teeth 16a provided at a flange 16, thus forming a gear coupling. A friction ring 17 may be constructed as a belt disk and mounted via a guide ring 19 at the hub 12. The friction ring 18 can likewise be constructed as a ring segment and directly threadedly connected with the hub 12.

The elastic component according to FIG. 1 as well as the gear coupling according to FIG. 3 allows for a radial as well as angular displacement of the shaft 1 in relation to the flange 4.

Figure 4:
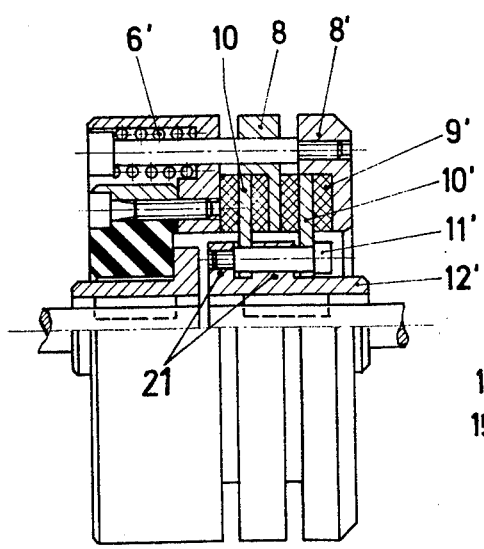
FIG. 4 is a cross-sectional view through an embodiment with two rows of friction bodies.

FIG. 4 illustrates an embodiment like FIG. 1, wherein however there are arranged a second row of friction linings 9' and segments 10', the friction force of which is produced by springs 6' simultaneously at both rows. Both rows of segments 10, 10' are secured by screws 11' at a hub 12'. It would be possible to arrange also still further rows of friction segments.

The mode of operation of the described coupling is as follows and will be considered in conjunction with FIG. 1.

The rotational moment of the shaft 1 is transmitted via the elastic element 3 to the flange 4 and ring 8, and the friction of the linings 9 to the segment 10, hub 12 and shaft 13. The transmitted rotational moment is adjusted by the tension of the springs 6 to the desired value. If this value is exceeded, then the friction linings slip and thus prevent that there will be transmitted too large a rotational moment.

If this rotational moment should be changed with the coupling assembled, then simply the springs 6 can be stressed by means of the screws 5 to a greater extent or relaxed, or there can be changed the number of springs at the periphery.

In the event that the friction linings 9 should be exchanged owing to wear or otherwise, then the screws 5 and 11 are completely detached; in this way the ring 8 is freed and the segments 10 with the friction linings 9 can be radially removed, without having to dismantle the hubs 2 or 12 from the shaft. The remounting of new friction linings occurs in the reverse sequence.

The elastic components 3 or 15, which drive the flange 4 or 16, can be randomly constructed. For instance, also the flange 16 or 4 with the hub 15 could be vulcanized to a rubber ring. An elastic component could also be arranged between the hub portion 12 and either the segment or disc 10 or the ring 18 in that the connection of such components is elastically configured. In this case the flange 4 can be constructed such that it can be directly connected with the shaft 1. In the case where there are no shaft displacements then it is possible to dispense with any elastic connection.

FIG. 5 is somewhat similar to FIG. 1, shows the inventive coupling, including an elastic element 20 that connects a hub portion 12a with both halves or rings 18 of the friction disk. The element 20 is connected to the portion 12a by means of the screws 11. The coupling further includes a ring 23 having threads for screwing up the ends of other screws 22 therein. The ring 23 presses the halves 18 against the elastic element 20 (attached to the hub portion 12), so that the friction disk is elastically coupled with one of the hub portions, namely 12a, of this coupling. FIG. 6 is a section of FIG. 5.

FIG. 7 shows how the halves or rings 18 of the friction disk can be removed from the coupling without dismantling the same. The halves are screwed down to a hub portion 12b by means of the screws 11. The hub portion has a flange 21 that lies in an opening 24 in a disk-like portion 25 of the opposed part or flange 16 of the coupling. The elastic element 20 is screwed down by means of screws 26 to the portion 25, as it is vulcanized on the other side to a second hub portion 15b.

If the screws 5, 11 are screwed off, the ring 8 can be replaced to the right, and the halves 18 of the friction disk can then be removed, as shown in this figure by means of arrowheads.

Instead of the springs 6 there also could be arranged in a ring-shaped manner a pressure air cylinder which produces the friction pressure in the same manner as the spring 6.

The advantages of the invention can be enumerated as follows:

The friction linings can be assembled and disassembled without the coupling components seated upon the shafts having to be displaced thereon or dismantled.
The rotational moment to be transmitted can be changed when the coupling has been completely mounted at the shafts.
The coupling permits of radial and angular displacements of the shafts to be coupled with one another.
There can be arranged a number of rows of friction bodies, which are all conjointly pressed by the same springs.
The coupling is very simple in construction and consists of only few parts.
At least one part of the coupling can be constructed as a belt disk, gear or part of a machine.

While there are shown and described presently preferred embodiments of the invention, it is to be distinctly understood that the invention is not limited thereto, but may be otherwise variously embodied and practiced within the scope of the invention.

What is claimed is:

1. An elastic friction overhead coupling for operatively connecting two shafts (1, 13) and transmitting a rotational moment therebetween, comprising, in combination, a first coupling part arranged on one (13) of said shafts and having a hub portion (12) as well as at least one friction disc (9, 10, 18) located between two elements (4, 8, 17) of a second coupling part which is arranged on the other shaft (1), so that said friction discs transmit the rotational moment, compressed by spring means (6) that act in the axial direction on first screws (5) which surround said friction discs and which are arranged substantially parallel to the axes of said shafts, said friction discs being thus compressed, wherein the outer diameter of said hub portion is smaller than the inner diameter of said two elements, said hub portion has a somewhat protruding flange portion (21) that extends to within said two elements, said at least one friction disc being threadedly (11) engaged with said flange portion, and wherein said friction discs consist of sectors (10) attached to said hub portion by means of second screws (11) so that said hub portion may remain on its place on said one shaft when exchanging said friction discs.

2. The coupling as defined in claim 1, wherein said second coupling part includes a second hub portion (15) and a flange (16), and wherein said second hub portion has teeth (15a) thereon which engage complementary teeth (16a) provided on said flange so as to constitute a gear coupling.

3. The coupling as defined in claim 1, wherein one of said elements (4, 8, 17) is a ring (17) in the form of a belt disc mounted about said hub portion (12) by the intermediary of a guide ring (19).

4. An elastic friction overload coupling for operatively connecting two shafts (1, 13) and transmitting a rotational moment therebetween, comprising, in combination, a first coupling part arranged on one (13) of said shafts and having a hub portion (12) as well as at least one friction disc (9, 10, 18) located between two elements (4, 8, 17) of a second coupling part which is arranged on the other shaft (1), so that said friction discs transmit the rotational moment, compressed by spring means (6) that act in an axial direction on first screws (5) which surround said friction discs and which are arranged substantially parallel to the axes of said shafts, said friction discs being thus compressed, and wherein said friction discs consist of sectors (10) attached to said hub portion by means of second screws (11) so that said hub portion may remain on its place on said one shaft when exchanging said friction discs, wherein said first screws (5) are freely displaceably guided through a flange (4) that constitutes a first one of said elements (4, 8, 17) in the second coupling part, and threaded ends of said first screws are screwed into a second one (8) of said elements, which second element is ring-shaped, said flange possesses at its periphery a flexed cylindrical section forming a covering for components of said second coupling part, and wherein said spring means (6) are located about said first screws and act between the heads of these screws and said flange.

5. The coupling as defined in claim 4, wherein said second coupling part includes a second hub portion (2) attached to said other shaft (1), and further comprising an elastic part (3) which is threadably connected with both said second hub portion and with said flange (4).

6. An elastic friction overload coupling for operatively connecting two shafts (1, 13) and transmitting a rotational moment therebetween, comprising, in combination, a first coupling part arranged on one (13) of said shafts and having a hub portion (12) as well as at least one friction disc (9, 10, 18) located between two elements (4, 8, 17) of a second coupling part which is arranged on the other shaft (1), so that said friction discs transmit the rotational moment, compressed by spring means (6) that act in an axial direction on first screws (5) which surround said friction discs and which are arranged substantially parallel to the axes of said shafts, said friction discs being thus compressed, and wherein said friction discs consist of sectors (10) attached to said hub portion by means of second screws (11) so that said hub portion may remain on its place on said one shaft when exchanging said friction discs, wherein said second coupling part includes a hub (15) and a flange (4, 16) that are vulcanized to form an elastic ring.

7. The coupling as defined in claim 6, further comprising an elastic component (20) arranged between said hub portion (12) and one (10, 18) of said friction discs (9, 10, 18) of the first coupling part.

8. The coupling as defined in claim 7, wherein said flange (4) is directly connected with said other shaft (1).

* * * * *